Oct. 24, 1961
G. G. DE HAAS
3,005,686
SODIUM SULFITE RECOVERY PROCESS
Filed May 5, 1958
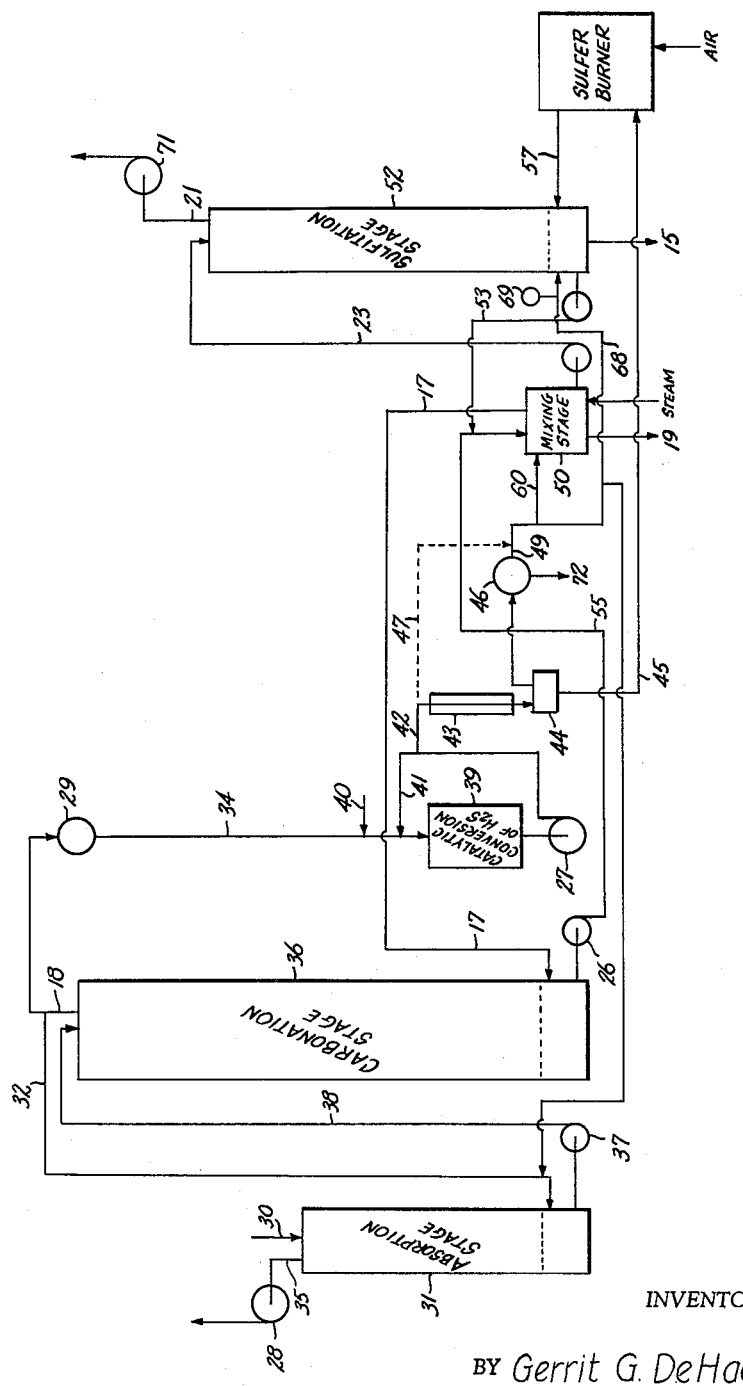
INVENTOR.
BY *Gerrit G. DeHaas*
*Leslie G. Noller*
ATTORNEY

# United States Patent Office 3,005,686
Patented Oct. 24, 1961

3,005,686
SODIUM SULFITE RECOVERY PROCESS
Gerrit G. De Haas, Longview, Wash., assignor to Weyerhaeuser Company, Tacoma, Wash., a corporation of Washington
Filed May 5, 1958, Ser. No. 733,177
11 Claims. (Cl. 23—131)

This invention relates to a process for the recovery of the sodium and sulfur values from the spent liquors of kraft, "neutral" sodium sulfite and, in particular, acid sodium sulfite wood pulping processes in the form of sodium sulfite and sodium bisulfite. More specifically, the new process relates to a cyclic recovery procedure in which the combined sulfur of the said spent liquors is separated from the sodium ions in the form of sulfur gases and recombined to produce the sodium sulfite for return to the pulping process.

It is well known to concentrate the waste liquors from wood pulping processes such as the kraft, "neutral" sodium sulfite and acid sodium sulfite pulping processes and burn off the organic matter in a smelting furnace to produce an inorganic ash or smelt consisting primarily of sodium sulfite and sodium carbonate. This smelt residue, in accordance with conventional procedures, is dissolved to produce what is known as green liquor. The conversion of this green liquor to a product which can be returned successfully to the sulfite pulping process has presented difficulties which make such a conversion an uneconomic consideration. It therefore has been common practice to dispose of the waste liquor by dumping it into streams or other bodies of water, thus producing pollution problems.

One of the principal difficulties encountered in the conversion of the green liquor to a solution containing sodium-, sulfite-, and possibly carbonate-ions results from the fact that if sulfide and sulfite ions are present in the same solution a considerable amount of sodium thiosulfate is formed, particularly at lower pH conditions. Sodium thiosulfate is undesirable in acid cooks. It also materially reduces the quantity of sulfur that can be recovered to form sodium sulfite, since each molecule of sodium thiosulfate contains twice as much sulfur per $Na_2O$ moiety as is contained in sodium sulfite. This greatly hampers the efficient recovery of the sulfur compounds and results in an accumulation of useless chemicals recirculating through the recovery system. Recovery processes have been suggested which are directed to minimizing or preventing the formation of sodium thiosulfate. Such processes have in common the expedient of subjecting the green liquor containing sodium sulfide to the action of carbon dioxide, thereby to generate hydrogen sulfide and at the same time form a mixture of sodium carbonate and bicarbonate. However, it has been found difficult to convert the $Na_2S$ practically completely to sodium carbonate-bicarbonate and to convert the $H_2S$ formed to $SO_2$ using no or little additional heat and without a "tie-in" with the recovery furnace, while at the same time eliminating the danger of explosions and the escape of toxic $H_2S$. Other difficulties that are often encountered are scaling of heat exchanger surfaces that are in contact with green liquor or the liquors produced from the green liquor, the precipitation of solids produced during the conversions, and a high steam consumption.

I have now devised a procedure which overcomes these difficulties and provides a recovery process for the sodium and sulfur values of green liquor which may be operated continuously for the effective conversion of the sodium compounds contained in the green liquor to sulfites capable of being re-used in the wood pulping digesters. This procedure provides a system which involves recirculation of liquor and gas streams that can be controlled automatically and require a minimum of supervision.

In accordance with the improved process of this invention the green liquor is reacted in a packed tower at a slight vacuum with a gas containing principally nitrogen and carbon dioxide. While the gases flow up the tower countercurrently to the liquor they convert the sodium sulfide contained in the green liquor to sodium carbonate and strip off the hydrogen sulfide that has been formed. The hydrogen sulfide concentration of the gas may vary considerably. It is low at the bottom of the tower, increases while passing up the tower, and finally decreases as it approaches the top of the tower. If the gas flow is reduced sufficiently, the concentration of the hydrogen sulfide as the gas leaves the system can be reduced to an insignificant value. The carbon dioxide concentration will also be removed. This is accomplished by carrying out the carbonation of the sodium sulfide content of the green liquor in two stages. In the stage just prior to exit of the gases from the system, hereinafter referred to as the absorption stage or the first stage carbonation, the hydrogen sulfide becomes absorbed as it advances to the top of the tower against the flow of the green liquor, and the carbon dioxide present in that stage reacts with the sodium sulfide in the lower regions of the same tower. In order to convert the sodium sulfide to sodium sulfite, it is necessary to introduce oxygen to the system. Economically this is introduced in the form of air so that a corresponding quantity of nitrogen is also introduced into the system, and unless it is purged it will tend to accumulate. In accordance with the operation of the absorption stage in the aforesaid tower, a substantial part of the nitrogen added with the air can be relieved from the system without removing any significant amount of hydrogen sulfide by reason of the absorption of practically all of the $H_2S$ and $CO_2$ from the controlled flow of gas containing these compounds and the nitrogen.

It was found that practically all of the sulfide content of the green liquor may be removed by contacting it with a large quantity of gas containing a high percentage of $CO_2$ passing countercurrently through a carbonation tower, while at the same time producing a gas which contains a suitable concentration of hydrogen sulfide which may be oxidized catalytically to the sulfur dioxide or elemental sulfur without the necessity of adding heat to raise the temperature of the gases, and with practically no sulfur trioxide formation. High hydrogen sulfide concentrations tend to produce explosive mixtures. It is an advantage of this process that the hydrogen sulfide concentration of the gas piped to the catalyst may be maintained below the limits of inflammability, but still sufficiently high to provide sufficient heat of conversion to raise the temperature of the gases to the desired level for conversion of the hydrogen sulfide to the sulfur dioxide or elemental sulfur. The maximum concentration of the $H_2S$ in the gas is 6% based on the total volume of the gas minus the oxygen content. The minimum concentration depends on the amount of hot gases leaving the catalyst, that is returned together with the fresh unreacted gas entering the catalyst system and the availability of a gas heat exchanger. However, generally the minimum concentration of $H_2S$ will be kept in excess of 1%. The temperature of the catalyst and gases should be at least 200° C., but should not exceed 400° C.

This process is applicable to the treatment of green liquor containing either a high or a low percentage of sodium sulfide. The influence of a decrease of the sodium sulfide concentration on the concentration of the hydrogen sulfide available from the carbonation stage is counteracted by an increase in the $CO_2$ concentration produced in the later stage sulfitation and recirculated to the primary carbonation stage to strip out the $H_2S$. This increase in the $CO_2$ concentration is made possible by the higher concentration of sodium carbonate present in a green liquor of low sulfidity. The gas volume needed to strip off a certain amount of $H_2S$ can be reduced if the $CO_2$ concentration of the stripping gas increases. Gas from the catalytic oxidation of $H_2S$, after scrubbing to eliminate sulfur containing gases, is recirculated. As the gas, that is recirculating through the system, originates from air and $CO_2$, developed from the carbonate-bicarbonate solution, it is relatively pure, and the result is a minimum of fouling of the catalyst. Another advantage of the system is that the $CO_2$ concentration "builds up" to a higher concentration than is found, for example, in flue gases. resulting in a more complete conversion of the $Na_2S$ in a smaller carbonation tower.

As the description of the illustrative modification of the invention progresses, it will become apparent that certain controls are possible and necessary to the continuous automatic operation of this process. Thus, within relatively wide limits of green liquor flow and concentrations of the sodium sulfide and sodium carbonate, the following variables may be utilized effectively as indicators by which to control the efficiency of the process:

(1) The $CO_2$ or $H_2S$ concentration of the gas that is used to treat the green liquor and the gases released to the atmosphere;

(2) The oxygen or $SO_2$ concentration of the gas leaving the catalyst;

(3) The temperature of the gas leaving the catalyst; and (4) The pH of the solution leaving the system.

In the accompanying drawing in connection with which the invention hereinafter will be more fully described, The figure is a diagrammatic flow sheet of a multiple tower installation capable of producing neutral or acid sulfite cooking liquor from a green liquor containing low or high percentages of sodium sulfide.

Referring now to the figure of the drawing, tower 31 is an absorption tower, and tower 36 is a carbonation tower. Both towers contain a special type of tower packing consisting of layers of coils made up of strips of sheet metal. A corrugated strip and a flat strip are rolled up to a coil that just fits into the tower. Operational difficulties encountered because of accumulations in the towers of dirt and sludge originating from the green liquor are eliminated by this type of packing.

The absorption of $CO_2$ and $H_2S$ in green liquor and the coversion of the sodium sulfide content to sodium carbonate and $H_2S$ are preferably carried out in two separate towers. As illustrated in the flow sheet, the figure of the drawing, the conversions are effected by novel combinations of re-cycling operations. The green liquor 30 enters the top of absorption tower 31. It descends countercurrently to a part 32 of the gas product 18 containing $CO_2$ and $H_2S$ in addition to nitrogen and an insignificant amount of oxygen. The gas leaving the tower at 35 and through fan 28 consists primarily of nitrogen. Fan 28 puts the system under a slight vacuum, thus preventing any contamination of the area around the conversion plant by toxic $H_2S$. The gas relieved from fan 28 can be piped to the regular recovery furnace stack or used as a source of nitrogen. Traces of $CO_2$ and $H_2S$ can be removed in a scrubber operated with make-up caustic. Some of the sodium sulfide of the green liquor is converted to sodium carbonate and sodium bicarbonate in this tower. The $H_2S$ liberated by this conversion is absorbed in the liquor as NaHS. Liquor in the sump of the absorption tower 31 is then pumped to the top of the carbonation tower 36 by pump 37 through line 38. Sufficient gas containing $CO_2$ is passed through the carbonation tower 36 countercurrently to the liquor to convert the NaHS and $Na_2S$ in the liquor to $Na_2CO_3$ and $NaHCO_3$, and to strip out the $H_2S$ absorbed in the liquor and formed in the carbonation tower. The major portion of gas 18 leaving the carbonation tower and containing the $H_2S$ is piped through a gas washer 29 and conduit 34 to the catalyst chamber 39, and sufficient air, or oxygen, is mixed with it at 40 for the catalytic conversion of all the $H_2S$ to $SO_2$, or sulfur and water vapor. The temperature of the gas mixture entering the catalyst chamber is raised by recirculating, by means of fan 27, a major part of the hot gases leaving the catalyst through conduit 41. If desired, a gas heat exchanger for the gases of 34 and 42 may be used. Such a heat exchanger should be placed in such a position that any liquified elemental sulfur runs with the gas into cooler 43 and separator box 44.

The cooler 43 cools the gases down to 120–150° C. The elemental sulfur is piped to the sulfur burner through 45. A gas washer 46 may be used to remove any carryover of elemental sulfur, and any residual $H_2S$ and $SO_2$ will react in the presence of water to form elemental sulfur in the gas washer 46 which is operated with spent liquor or water. The liquor effluent from it 72 may be united with the spent liquor piped to the recovery furnace.

When the green liquor is of low sulfidity it is preferable to convert the $H_2S$ to $SO_2$ since more air can be used without unnecessarily diluting the $CO_2$. The available $CO_2$ increases as the sulfidity decreases. Conversely, with a high sulfidity green liquor the available $CO_2$ is less and conversion of the $H_2S$ to S is preferred in order to keep the dilution of the $CO_2$ to a minimum. Stoichiometric quantities or a slight excess of oxygen are introduced with the air when it is desired to oxidize to elemental S, and a controlled excess when it is desired that the reaction go to $SO_2$. Too great an excess in the latter case will promote the formation of $SO_3$, particularly at high temperatures.

The catalyst may be any conventional catalyst suitable for the conversion of $H_2S$ to $SO_2$ or S, but preferably is precipitated platinum or nickel carbonate on a carrier. The catalyst may be prepared as described in British Patent No. 675,349. Although the same catalyst may be used for either reaction, the nickel catalyst gives the highest efficiency for conversion to $SO_2$. For conversion to elemental S it has been found that an aluminum base catalyst is best. For the preparation of the aluminum base catalyst two or more of the following compounds, one being an aluminum compound, are precipitated on a carrier from aqueous solution: aluminum hydroxide, aluminum sulfate, sodium silico fluoride, ammonium chloride, and sodium silicate. The catalyst is preheated in the catalyst chamber 39 to a temperature of from 200°–350° C., and is maintained at a temperature not in excess of 400° C. Some of the moisture carried by the entering gas may be removed in the gas washer 29 by condensation before the gas passes through the catalyst chamber 39. A quantity of nickel salt containing one pound of nickel was sufficient to produce enough catalyst to convert to $SO_2$ more than 98% of the $H_2S$ contained in 45 cu. ft. of gas per minute at a temperature of 240° C. The gas contained 30% $CO_2$, 15% $H_2O$ and 2.5% $H_2S$ in addition to nitrogen and oxygen. At higher inlet temperatures considerably higher gas flow rates could be handled. In the case where the $H_2S$ is converted to elemental sulfur, a portion of the gas 49 may be used in the absorption tower 31 instead of the gas piped from line 18.

The liquor in the sump of the carbonation tower 36 containing sodium carbonate and sodium bicarbonate is pumped by means of pump 26 directly to a mixing tank 50. Sodium bisulfite solution from a sulfitation tower 52 is piped through line 53 to join line 55 entering mixing tank 50. The liquor and gas temperatures in towers 31 and 36 and tank 50 are approximately the same (60–90° C.), and therefore little or no steam is used up in the mixing tank 50. Some steam is added to the mixing tank only if the temperature of the bisulfite liquor 53 from the sulfitation tower is lower than that of towers 31 and 36. Under normal conditions the liquor leaving the carbonation tower contains only traces of or no $Na_2S$ and NaHS. However, it was found that if for some reason a significant amount of sulfide does appear in this liquor the residue sulfide can be stripped off by passing steam and the $CO_2$ developed in tank 50 first countercurrently to the liquor 55 through a relatively small tower. In this case the gas 60 is not added to tank 50, but to the upper part of the small tower.

Excess gas 68 is piped to the bottom of the sulfitation tower. Instead of the mixing tank 50 a small tower may be used. The sodium carbonate-bicarbonate solution 55 and the bisulfite solution 53 are sprayed into the top. The $CO_2$ developed by the reaction is stripped from the liquor by the same steam introduced at the bottom of this small tower. The gas 60 from the catalyst system may be piped to the bottom of the tower instead of steam, or it is piped directly to line 17.

The liquor in the mixing tank 50 containing essentially sodium, sulfite, and carbonate ions is pumped through conduit 23 to the top of the bisulfite or sulfitation tower 52 for countercurrent passage with gases 57 from a sulfur burner and the $H_2S$ catalytic converter if $SO_2$ is produced in the latter. The $SO_2$ reacts with the sodium sulfite to produce sodium bisulfite in the sulfitation tower. The sodium bisulfite solution is then returned to the mixing tank 50 through line 53.

The temperature of the liquor in the carbonation tower generally should not drop below 65° C. in order to prevent the crystallization of sodium bicarbonate. It is preferable that the liquors in the system be maintained at a temperature of about 70° C. by introduction of the green liquor at that temperature and addition of such amounts of steam as may be made necessary by heat losses.

In the following examples which are intended to be illustrative, and not limitative, of the invention, the treated liquor is a smelt liquor derived from a kraft and a neutral sulfite pulping process to which sodium sulfide has been added in order to make the treated liquor representative of an acid sulfite green liquor. This was done since it was a particular objective of the development of this process to produce an acid sulfite cooking liquor from the waste liquors. However, it is to be understood that the process can be used for the production of a neutral sulfite cooking liquor from the waste liquors of a neutral sulfite process. Since the cooking liquor for a neutral sulfite pulping process involves different quantities of chemicals per unit of neutral sulfite pulp, the flow rate of the smelt liquor to the recovery system would be adjusted to provide the chemicals necessary to produce the amount of cooking liquor required per unit of time.

In each of the examples the equipment shown in the flow diagram of the figure of the drawing was employed in a pilot plant system. The absorption tower 31, the carbonation tower 36, and sulfitation tower 52 were packed with the special type of packing described above. The smelt liquor from a kraft and neutral sulfite mill was piped to a mixing tank where the sodium sulfide necessary to increase the sulfidity to that of a typical acid sulfite green liquor was added.

EXAMPLE 1

Acid sulfite green liquor from the above-mentioned mixing tank was delivered at a temperature of 70° to 80° C. to the top of the absorption tower 31. The said green liquor was delivered at such a rate as to provide the chemicals necessary to produce 148 gram moles per minute of "combined" ($Na_2SO_3$ calculated as $SO_2$) or the 30,000 lbs. per day necessary to provide a cooking liquor for an acid sulfite mill producing 100 tons of pulp per day. At the dilution used the flow rate was about 20 gallons per minute. This provided the following chemicals at the beginning of the absorption stage:

(1) $\begin{cases} S^- \text{_____} & 78.3 \text{ moles/min.} = 6.1 \text{ kg./min. } Na_2S. \\ CO_3^- \text{\_\_\_} & 9.7 \text{ moles/min.} = 7.4 \text{ kg./min. } Na_2CO_3. \\ S_2O_3^- \text{\_\_} & 2.11 \text{ moles/min.} = 0.33 \text{ kg./min. } Na_2S_2O_3. \end{cases}$ This green liquor descended in the absorption tower against a countercurrent flow of a part 32 of the gas product 18 of the carbonation tower 36, said gas containing:

(2) $\begin{cases} H_2S \text{_____} & 3.35 \text{ moles/min.} - 2.6\% \\ CO_2 \text{\_\_\_\_\_} & 56.8 \text{ moles/min.} = 44.7\% \\ N_2(+O_2) \text{\_\_} & 66.9 \text{ moles/min.} - 52.7\% \end{cases}$ 127 cu. ft./min.

All gas volumes calculated for 72° C. and without consideration of water vapor.

After reacting with gas (2) the liquor at the bottom of absorption tower 31 assayed:

(3) $\begin{cases} S^- \text{\_\_\_\_\_} & 81.5 \text{ moles/min.} = 4.56 \text{ kg. NaHS} \\ CO_3^- \text{\_\_\_} & 125.5 \text{ moles/min.} = 9.43 \text{ kg. } Na_2CO_3;\ 3.07 \text{ kg. } NaHCO_3 \\ S_2O_3^- \text{\_\_} & 2.11 \text{ moles/min.} = 0.34 \text{ kg. } Na_2S_2O_3 \end{cases}$ The gas leaving the top of the absorption tower 31 and released to atmosphere at 35 contained:

(4) $\begin{cases} H_2S \text{_____} & 0.15 \text{ moles/min.} - 0.2\% \\ CO_2 \text{\_\_\_\_\_} & 1.0 \text{ moles/min.} - 1.5\% \\ N_2(+O_2) \text{\_\_} & 66.9 \text{ moles/min.} - 98.3\% \end{cases}$ 68 cu. ft/min.

Liquor (3) was pumped by means of pump 37 through line 38 to the top of carbonation tower 36 where it descended countercurrently to a flow of gas 17 from the mixing tank 50. This gas consisting of:

(5) $\begin{cases} N_2(+O_2) \text{\_\_} & 1,620 \text{ moles/min.} - 52.5\% \\ CO_2 \text{\_\_\_\_\_} & 1,470 \text{ moles/min.} - 47.5\% \\ H_2S \text{_____} & 1.28 \text{ moles/min.} \end{cases}$ 3,091 cu. ft./min.

reacted with liquor (3) according to following equations:

(I)  $2NaHS + CO_2 + H_2O \rightarrow Na_2CO_3 + 2H_2S$
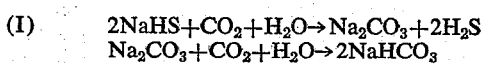
$Na_2CO_3 + CO_2 + H_2O \rightarrow 2NaHCO_3$ to produce a liquor in the sump of the tower 36 assaying:

(6) $\begin{cases} S^- \text{\_\_\_\_\_} & 1.68 \text{ moles/min.} = 0.09 \text{ kg. NaHS.} \\ CO_3^- \text{\_\_\_} & 219.5 \text{ moles/min.} = 7.93 \text{ kg. } Na_2CO_3;\ 12.15 \text{ kg. } NaHCO_3. \\ S_2O_3^- \text{\_\_} & 2.11 \text{ moles/min.} = 0.34 \text{ kg. } Na_2S_2O_3. \end{cases}$ and a gas 18 leaving the top of the tower consisting of:

(7) $\begin{cases} N_2(+O_2) \text{\_\_} & 1,620 \text{ moles/min.} - 52.7\% \\ CO_2 \text{\_\_\_\_\_} & 1,376 \text{ moles/min.} - 44.7\% \\ H_2S \text{_____} & 81.1 \text{ moles/min.} - 2.6\% \end{cases}$ 3,077 cu. ft./min.

A part of gas (7) was returned to the absorption tower 31 through line 32 as gas (2). The remainder of gas (7) was mixed with air and the mixture conducted to catalyst chamber 39 which had been preheated to about 240° C. The mixed gas consisted of:

(8) $\begin{cases} N_2(+O_2) \text{\_\_} & 1,553 \text{ moles/min.} - 49.3\% \\ CO_2 \text{\_\_\_\_\_} & 1,322 \text{ moles/min.} - 42.0\% \\ H_2S \text{_____} & 77.7 \text{ moles/min.} - 2.5\% \\ Air \text{_____} & 195.2 \text{ moles/min.} - 6.2\% \end{cases}$ 3,148 cu. ft./min.

The $H_2S$ of gas (8) was converted to elemental sulfur which was piped to the sulfur burner and a gas product consisting of:

$\begin{cases} N_2(+O_2) \text{\_\_\_} & 1,709.3 \text{ moles/min.} - 56.4\% \\ CO_2 \text{_____} & 1,322 \text{ moles/min.} - 43.6\% \end{cases}$ 3,030 cu. ft./min.

which was piped to the mixing tank 50 (2873 cu. ft./min.) and the excess (157 cu. ft./min.) vented to atmosphere through the sulfitation tower 52.

The liquor (6) from the sump of carbonation tower was pumped to the top of mixing tank 50 where it was mixed with liquor (11) from the sulfitation tower 52. The following reactions took place in this step:

(II)  $Na_2CO_3 + 2NaHSO_3 \rightarrow 2Na_2SO_3 + H_2O + CO_2$
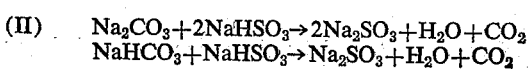
$NaHCO_3 + NaHSO_3 \rightarrow Na_2SO_3 + H_2O + CO_2$ producing a product liquor and a product gas (5). The latter was recirculated via 17 to the bottom of the carbonation tower 36, as indicated above. The liquor product was divided, one part being withdrawn as product, and the other part delivered to the top of sulfitation tower 52. (The flow of liquor used to make bisulfite solution depends on the other facilities available in the mill. In the acid sulfite mill, for example, a lower flow will be sufficient because a liquor with a relatively high concentration of "free $SO_2$" will be available, while in a neutral sulfite mill higher flows will be used, especially if the sulfitation tower is operated at temperatures up to 70° C.) These portions of product liquor each contained:

(9) $\begin{cases} SO_3^- & 152.1 \text{ moles/min.}=18.23 \text{ kg. } Na_2SO_3; 0.77 \text{ kg. } NaHSO_3. \\ CO_3^- & \text{Traces.} \\ S_2O_3^- & 2.71 \text{ moles/min.}= 0.43 \text{ kg. } Na_2S_2O_3. \end{cases}$ The liquor (9) descends through the sulfitation tower countercurrently to the flow of gas from the sulfur burner which latter has the composition:

(10) $\begin{cases} N_2(+O_2) & 765 \text{ moles/min.}—83.3\% \\ SO_2 & 152.9 \text{ moles/min.}—16.7\% \end{cases}$918 cu.ft./min.

and reacts therewith as follows:

(III)     $Na_2SO_3 + SO_2 + H_2O \rightarrow 2NaHSO_3$

The liquor product of reaction III having the composition:

(11) $\begin{cases} SO_3^- & 305 \text{ moles/min.}=30.85 \text{ kg. } NaHSO_3; 0.52 \text{ kg. } SO_2. \\ S_2O_3^- & 2.71 \text{ moles/min.}= 0.43 \text{ kg. } Na_2S_2O_3. \end{cases}$ was returned via 53 to the mixing tank 50 for reaction II with the $Na_2CO_3/NaHCO_3$ liquor from the carbonation tower as indicated above.

The residual gas containing $N_2(+O_2)$—765 moles/min. and traces of $SO_2$ was vented to the atmosphere at 21.

As was mentioned above, in case the mill is operated in such a way that a significant amount of $SO_2$ appears in the recovery furnace flue gases, the liquor from the mixing tank 50 can be passed first through auxiliary towers countercurrent to the flue gases and then used in the sulfitation tower 52.

EXAMPLE 2

I. *Absorption and carbonation section*

In this example the same procedure and equipment as used in Example 1 were used, except that the $H_2S$ was catalytically oxidized to $SO_2$ instead of sulfur in the catalyst chamber. The quantities are on a per minute basis. A portion of the product gas from the catalyst was delivered to the sulfitation tower via 68, and the remainder 47 was delivered to the mixing tank via 60 for reaction with the $NaHCO_3$ content of the mixed liquor as follows:

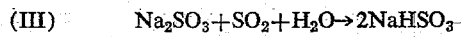

$2NaHCO_3 + SO_2 \rightarrow Na_2SO_3 + H_2O + 2CO_2$

The assay conditions obtaining in the various stages of the process were as follows:

Green liquor entering the top of the absorption tower:

(1) $\begin{cases} S^- & 52.35 \text{ moles}= 4.08 \text{ kg. } Na_2S. \\ CO_3^- & 96.4 \text{ moles}=10.22 \text{ kg. } Na_2CO_3. \\ S_2O_3^- & 1.28 \text{ moles}= 0.20 \text{ kg. } Na_2S_2O_3. \end{cases}$ Gas entering the bottom of the absorption tower—This is a part of the gas leaving the top of the carbonation tower:

(2) $\begin{cases} H_2S & 5.43 \text{ moles}— 2.9\% \\ CO_2 & 45.33 \text{ moles}—23.9\% \\ N_2(+O_2) & 138.3 \text{ moles}—73.2\% \end{cases}$189 cu.ft./min.

Liquor leaving the bottom of the absorption tower—This liquor is piped to the top of the carbonation tower:

(3) $\begin{cases} S^- & 57.8 \text{ moles}= 3.23 \text{ kg. } NaHS. \\ CO_3^- & 140.8 \text{ moles}=10.49 \text{ kg. } Na_2CO_3; 3.52 \text{ kg. } NaHCO_3. \\ S_2O_3^- & 1.28 \text{ moles}= 0.20 \text{ kg. } Na_2S_2O_3. \end{cases}$ Gas leaving the top of the absorption tower—This gas is released to the atmosphere:

(4) $\begin{cases} H_2S & 0.08 \text{ moles}— 0.06\% \\ CO_2 & 0.93 \text{ moles}— 0.60\% \\ N_2(+O_2) & 138.3 \text{ moles}—99.30\% \end{cases}$139 cu.ft./min.

Gas entering the bottom of the carbonation tower—This gas comes from the mixing-bisulfite section:

(5) $\begin{cases} H_2S & 3.3 \text{ moles}— 0.2\% \\ CO_2 & 534.2 \text{ moles}—27.5\% \\ N_2(+O_2) & 1,402 \text{ moles}—72.3\% \end{cases}$1,940 cu.ft./min.

Liquor leaving the carbonation tower:

(6) $\begin{cases} S^- & 5.1 \text{ moles}=0.29 \text{ kg. } NaHS. \\ CO_3^- & 215 \text{ moles}=8.21 \text{ kg. } Na_2CO_3; 11.58 \text{ kg. } NaHCO_3. \\ S_2O_3^- & 1.28 \text{ moles}=0.20 \text{ kg. } Na_2S_2O_3. \end{cases}$ Gas leaving the top of the carbonation tower—Part of this gas is piped to the absorption tower and part to the catalyst section:

(7) $\begin{cases} H_2S & 56 \text{ moles}— 2.9\% \\ CO_2 & 460 \text{ moles}—23.9\% \\ N_2(+O_2) & 1,402 \text{ moles}—73.2\% \end{cases}$1,918 cu.ft./min.

II. *Catalyst section*

Gas entering the catalyst system—This is a part of the gas leaving the top of the carbonation tower:

(8) $\begin{cases} N_2(+O_2) & 1,264 \text{ moles}—73.2\% \\ CO_2 & 414 \text{ moles}—23.9\% \\ H_2S & 50.6 \text{ moles}— 2.9\% \end{cases}$1,729 cu.ft./min.

Air Added: 382.5 moles.

Gas leaving catalyst system—This gas is piped via 60 to the mixing tank 50 and via 68 to the sulfitation tower 52:

(9) $\begin{cases} N_2(+O_2) & 1,571.6 \text{ moles}—77.2\% \\ CO_2 & 414 \text{ moles}—20.3\% \\ SO_2 & 50.6 \text{ moles}— 2.5\% \end{cases}$2,036 cu.ft./min.

III. *Mixing-bisulfite section*

Liquor from carbonation tower delivered to mixing tank 50:

(See above (6))

Liquor from bisulfite tower delivered to mixing tank 50:

(10) $\begin{cases} SO_3^- & 209.8 \text{ moles}=10.40 \text{ kg. } Na_2SO_3; 13.23 \text{ kg. } NaHSO_3. \\ S_2O_3^- & 3.98 \text{ moles}=0.63 \text{ kg. } Na_2S_2O_3. \end{cases}$ Gas from the catalyst section (part of 9):

(11) $\begin{cases} N_2(+O_2) & 1,402 \text{ moles}—77.2\% \\ CO_2 & 369.5 \text{ moles}—20.3\% \\ SO_2 & 45.2 \text{ moles}— 2.5\% \end{cases}$1,817 cu. ft./min.

Liquor leaving tank 50 as produced liquor:

(12) $\begin{cases} SO_3^- & 125.6 \text{ moles}=15.83 \text{ kg. } Na_2SO_3. \\ CO_3^- & 25.5 \text{ moles}= 1.63 \text{ kg. } Na_2CO_3; 0.85 \text{ kg. } NaHCO_3. \\ S_2O_3^- & 3.98 \text{ moles}= 0.63 \text{ kg. } Na_2S_2O_3. \end{cases}$ Liquor leaving tank 50 to be recirculated through bisulfite tower 52:

(13) $\begin{cases} SO_3^- & 125.6 \text{ moles}=15.83 \text{ kg. } Na_2SO_3. \\ CO_3^- & 25.5 \text{ moles}= 1.63 \text{ kg. } Na_2CO_3; 0.85 \text{ kg. } NaHCO_3. \\ S_2O_3^- & 3.98 \text{ moles}= 0.63 \text{ kg. } Na_2S_2O_3. \end{cases}$ Gas from tank 50 to be recirculated to bottom of the carbonation tower via 17:

(See above (5))

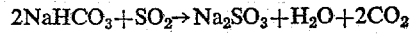

Gas entering the bottom of the bisulfite tower:

A. From Catalyst Section via 68 (Part of 9)

(14) $\begin{cases} N_2(+O_2) & 169.6 \text{ moles}—77.2\% \\ CO_2 & 44.5 \text{ moles}—20.3\% \\ SO_2 & 5.4 \text{ moles}— 2.5\% \end{cases}$219 cu. ft./min.

B. From the Sulfur Burner via 57

(15) $\begin{cases} N_2(+O_2) & 393.5 \text{ moles}—83.3\% \\ SO_2 & 78.6 \text{ moles}—16.7\% \end{cases}$472 cu. ft./min.

Liquor leaving the bottom of the bisulfite tower 52: This liquor is returned to the top of the mixing tank 50:

(See above (10))

Gas leaving the top of the bisulfite tower—This gas is piped to the flue gas duct:

(16) $\begin{cases} N_2(+O_2) & 563.1 \text{ moles}—92.8\% \\ CO_2 & 43.8 \text{ moles}— 7.2\% \\ SO_2 & \text{Traces} \end{cases}$607 cu. ft./min.

EXAMPLE 3

I. *Absorption and carbonation section*

Green liquor entering the top of the absorption tower at 70°–80° C. provided the following quantities of the identified chemicals. (All quantities are on a per minute basis).

(1) $\begin{cases} S^- & 36 \text{ moles}= 2.81 \text{ kg. } Na_2S. \\ CO_3^- & 114 \text{ moles}=12.08 \text{ kg. } Na_2CO_3. \\ S_2O_3^- & 1.4 \text{ moles}= 0.22 \text{ kg. } Na_2S_2O_3. \end{cases}$ Gas having the following composition, and being part of the gas leaving the top of carbonation tower 36, was delivered to the bottom of absorption tower 31 to flow countercurrently to the green liquor:

(2) $\begin{cases} H_2S\text{------} & 3.63 \text{ moles}-2.4\% \\ CO_2\text{------} & 72.4 \text{ moles}-48.8\% \\ N_2(+O_2)\text{---} & 72.5 \text{ moles}-48.8\% \end{cases}$ 148 cu. ft./min.

The $H_2S$ and $CO_2$ content of the gas were absorbed in the green liquor and reacted with the $Na_2S$ to produce NaHS, $Na_2CO_3$ and $NaHCO_3$.

The liquor leaving the bottom of the absorption tower had the following composition:

(3) $\begin{cases} S^-\text{------} & 39.58 \text{ moles}=2.22 \text{ kg. NaHS.} \\ CO_3^-\text{---} & 185 \text{ moles}=8.00 \text{ kg. } Na_2CO_3; 9.19 \text{ kg. } NaHCO_3. \\ S_2O_3^-\text{---} & 1.4 \text{ moles}=0.22 \text{ kg. } Na_2S_2O_3. \end{cases}$ The gas leaving the top of absorption tower 31 had the following composition:

(4) $\begin{cases} H_2S\text{------} & 0.05 \text{ moles}-0.07\% \\ CO_2\text{------} & 1.4 \text{ moles}-1.90\% \\ N_2(+O_2)\text{---} & 72.5 \text{ moles}-98.00\% \end{cases}$ 740 cu. ft./min.

The liquor (3) was pumped via 37 to the top of carbonation tower 36 and allowed to fall freely through the packing against the ascending flow of gas entering at the bottom via conduit 17 having the following composition:

(5) $\begin{cases} H_2S\text{------} & 0.4 \text{ moles} \\ CO_2\text{------} & 825.2 \text{ moles}-51.6\% \\ N_2(+O_2)\text{---} & 771.6 \text{ moles}-48.4\% \end{cases}$ 1,598 cu. ft./min.

The $CO_2$ reacted with the NaHS and $Na_2CO_3$ to produce $H_2S$ and $NaHCO_3$.

The liquor leaving the bottom of the carbonation tower had the following composition:

(6) $\begin{cases} S^-\text{------} & 1.4 \text{ moles}=0.08 \text{ kg. NaHS.} \\ CO_3^-\text{---} & 240 \text{ moles}=6.34 \text{ kg. } Na_2CO_3; 15.13 \text{ kg. } NaHCO_3. \\ S_2O_3^-\text{---} & 1.4 \text{ moles}=0.22 \text{ kg. } Na_2S_2O_3. \end{cases}$ and the gas leaving the top of the carbonation tower analyzed as follows:

(7) $\begin{cases} H_2S\text{------} & 38.58 \text{ moles}-2.4\% \\ CO_2\text{------} & 770.2 \text{ moles}-48.8\% \\ N_2(+O_2)\text{---} & 771.6 \text{ moles}-48.8\% \end{cases}$ 1,580 cu. ft./min.

II. *Catalytic section*

A major part of said gas (7) having the following composition:

(8) $\begin{cases} H_2S\text{------} & 34.95 \text{ moles}-2.4\% \\ CO_2\text{------} & 697.8 \text{ moles}-48.8\% \\ N_2(+O_2)\text{---} & 699.1 \text{ moles}-48.8\% \\ \text{Air added---} & 262 \text{ moles} \end{cases}$ 1,432 cu. ft./min.

was delivered to the catalytic chamber 39 via conduit 34. The remaining part (2) was delivered to the absorption tower 31 as stated above.

The catalytic chamber was preheated to reaction temperature of about 300° C., and the temperature was maintained under 400° C. by recycling a controlled portion of the hot reaction gases. The $H_2S$ of the gas (8) was completely converted to $SO_2$, the gas leaving the catalytic chamber consisting of:

(9) $\begin{cases} SO_2\text{------} & 34.95 \text{ moles}-2.1\% \\ CO_2\text{------} & 697.8 \text{ moles}-42.5\% \\ N_2(+O_2)\text{---} & 908.6 \text{ moles}-55.4\% \end{cases}$ 1,641 cu. ft./min.

III. *Mixing section*

The liquor product (6) of the carbonation reaction was delivered from the bottom of the carbonation tower 36 to the mixing tank 50. To this was added the liquor product of the sulfitation or bisulfite tower 52 having the following composition:

(10) $\begin{cases} SO_3^-\text{---} & 276.35 \text{ moles}=2.6 \text{ kg. } Na_2SO_3; 26.6 \text{ kg. } NaHSO_3. \\ S_2O_3^-\text{---} & 2.9 \text{ moles}=0.46 \text{ kg. } Na_2S_2O_3. \end{cases}$ A part of the gas product (9) of the catalytic conversion having the following composition:

(11) $\begin{cases} SO_2\text{------} & 29.65 \text{ moles}-2.1\% \\ CO_2\text{------} & 592 \text{ moles}-42.5\% \\ N_2(+O_2)\text{---} & 771.6 \text{ moles}-55.4\% \end{cases}$ 1,393 cu. ft./min.

was also delivered to the mixing chamber where the following reactions took place:

$$Na_2SO_3+SO_2+H_2O \to 2NaHSO_3$$
$$Na_2CO_3+2NaHSO_3 \to 2Na_2SO_3+H_2O+CO_2$$
$$NaHCO_3+NaHSO_3 \to Na_2SO_3+H_2O+CO_2$$
$$2NaHCO_3+SO_2 \to Na_2SO_3+H_2O+2CO_2$$

The liquor product of the mixing chamber reaction was divided equally, one-half being withdrawn from the system at 19, and one-half being delivered to the top of the sulfitation tower 52 via 23. Each half of the said liquor product had the following composition:

(12) $\begin{cases} SO_3^-\text{---} & 152 \text{ moles}=17.84 \text{ kg. } Na_2SO_3; 1.08 \text{ kg. } NaHSO_3. \\ S_2O_3^-\text{---} & 2.9 \text{ moles}= 0.46 \text{ kg. } Na_2S_2O_3. \\ CO_3^-\text{---} & 3.4 \text{ moles}= 0.29 \text{ kg. } NaHCO_3. \end{cases}$

(13) $\begin{cases} SO_3^-\text{---} & 152 \text{ moles}=17.84 \text{ kg. } Na_2SO_3; 1.08 \text{ kg. } NaHSO_3. \\ S_2O_3^-\text{---} & 2.9 \text{ moles}= 0.46 \text{ kg. } Na_2S_2O_3. \\ CO_3^-\text{---} & 3.4 \text{ moles}= 0.29 \text{ kg. } NaHCO_3. \end{cases}$ The gas product of the mixing chamber reactions consisting of $CO_2$, inert $N_2$ and traces of $O_2$ and $H_2S$, as shown in the gas composition (5) above, was recirculated to the bottom of the carbonation tower 36 via conduit 17.

IV. *Sulfitation section*

The remainder of the gas product (9) of the catalytic conversion having the following composition:

(14) $\begin{cases} SO_2\text{------} & 5.3 \text{ moles}-2.1\% \\ CO_2\text{------} & 105.8 \text{ moles}-42.5\% \\ N_2(+O_2)\text{---} & 137 \text{ moles}-55.4\% \end{cases}$ 248 cu.ft./min.

was delivered to the bottom of the sulfitation tower 52 via pipe 68, and to this was added make-up $SO_2$ gas having the following composition:

(15) $\begin{cases} SO_2\text{------} & 119.05 \text{ moles}-16.0\% \\ N_2(+O_2)\text{---} & 626 \text{ moles}-84.0\% \end{cases}$ 745 cu.ft./min.

delivered from the sulfur burner via pipe 57. The $SO_2$ gases ascended in the sulfitation tower against the flow of the $Na_2SO_3$ liquor falling through the tower packing, causing the following reaction to take place:

$$Na_2SO_3+SO_2+H_2O \to 2NaHSO_3$$

The liquor product of the sulfitation tower consisting principally of $NaHSO_3$, as shown in liquor composition (10) above, was returned to the mixing chamber 50.

The gas product of the sulfitation tower 52 having the following composition:

(16) $\begin{cases} SO_2\text{------} & \text{traces} \\ N_2(+O_2)\text{---} & 763 \text{ moles} \end{cases}$ 763 cu.ft./min.

was vented to the atmosphere.

The system is suitable to be regulated automatically. The major reasons for readjustment of the operating concentrations are changes in the green liquor flow and composition. The operation of the absorption tower is determined by the composition of the gases (4) leaving the tower. If a $CO_2$ recorder analyzing the gas (4) indicates an increase, the control equipment connected to a damper in the line 32 carrying the gas to the tower reduces the flow until the $CO_2$ concentration and, simultaneously, $H_2S$ concentration is reduced to the desired level. The operation of the carbonation tower is determined by the temperature of the gas entering the catalyst. If, for example, the temperature increases, the control equipment connected to a damper in the line 34 increases the flow of the gas circulating through the carbonation tower and the catalyst system. This results in a decrease of the $H_2S$ concentration and a lowering of the gas temperature to the desired level. The air flow 40 to the system is regulated by the indications of the oxygen analyzer testing the gas (9) leaving the catalyst, if the gas is converted to $SO_2$. In the case of Example 1, involving the conversion of the $H_2S$ to elemental sulfur, the $SO_2$ concentration of this gas is maintained at a certain low level, and the $SO_2$ indicator regulates the addition of air. The amount of gas that is recirculated through 41 is several times the flow of gas entering the catalyst system, and normally no changes of the flow of gas that is recirculated are necessary. There is a damper in line 68 that is governed by a slight vacuum indicator 69 hooked up to line 68 before the damper. The $SO_2$ concentration of the gas (16) released to the atmosphere from the bisulfite tower determines the $SO_2$ flow to the bisulfite tower. As a considerable amount of liquor is contained in the tank the regulation of the $SO_2$ flow, i.e., the sulfur burner, will be slow. The liquor flow to the bisulfite tower 52 from the mixing tank 50 and the recycle to the latter is determined by the pH of the liquor in the tank 50. If a relatively high pH is maintained in the liquor of tank 50 of from 6.5–7.5, the solution contains carbonate and sulfite, or sulfite with little or no excess bisulfite. The $SO_2$ content of the gas (16) that is relieved via 21 from the sulfitation tower 52 is low in this case. A lower pH means the presence of an increasing amount of bisulfite. The $SO_2$ concentration of gas (16) relieved from the sulfitation tower 52 increases unless the tower is operated at a lower temperature. If a significant amount of $SO_2$ appears in gas (16), this gas is piped to the duct of the recovery furnace flue gases through fan 71 before they pass the absorption towers. However, if it is required to produce a liquor containing a relatively high concentration of "free $SO_2$," the liquor leaving the installation is tapped off at 15 from the sulfitation tower, rather than from tank 50 at 19.

The sample flowing to the pH recorder is heated to a slightly higher constant temperature before it reaches the electrodes.

The conversion of the green liquor to a sodium carbonate-bicarbonate solution makes it possible to eliminate an accumulation of, for example, sodium chloride. By lowering the temperature of the liquor leaving the carbonation tower in the presence of $CO_2$ (from tank 50), a substantial part of the "sodium" can be precipitated as sodium bicarbonate. The liquor is decanted or filtered off, and the sodium bicarbonate is added to the mixing tank 50. The gas from the catalyst system in line 60 is piped directly to line 17. The filtrate is returned to the green liquor smelt dissolving tank, or discarded.

The acid sulfite spent liquor can be neutralized, and the sodium-sulfur ratio in the spent liquor can be raised by operating one of the smelt dissolving tanks periodically or continuously with spent liquor. The neutralization not only reduces the corrosiveness of the spent liquor, but increases at the same time the amount of "sulfur" that can be processed in the green liquor-sodium sulfite conversion system. The $CO_2$ and $H_2S$ developed during the neutralization is added to the gas in line 34 that is piped to the catalyst system.

Having thus described my invention and illustrated it by preferred embodiments, I claim as new and desire to protect by Letters Patent:

1. The method of continuously converting the sodium sulfide and sodium carbonate content of green liquor, derived from a smelt of the waste liquor from the pulping of wood, to sodium sulfite for re-use in the pulping process, which method comprises a $CO_2$ and $H_2S$ absorption stage (A), a carbonation stage (B), an $H_2S$ conversion stage (C), a $Na_2CO_3$, $NaHCO_3$ and $NaHSO_3$ mixing stage (D), and a sulfitation stage (E);

passing a gas containing nitrogen, hydrogen sulfide and carbon dioxide countercurrently through a descending flow of the green liquor at a temperature of from 60°–90° C. in the said absorption stage (A), whereby the carbon dioxide and hydrogen sulfide are separated almost quantitatively from the said gas by reacting with some of the sodium sulfide and sodium carbonate of the liquor to produce sodium hydrosulfide and sodium bicarbonate;

withdrawing the remainder of said gas comprising almost entirely nitrogen from said stage (A) by maintaining the system under a slight vacuum;

subjecting the residual liquor from the said absorption stage (A) containing sodium hydrosulfide, sodium sulfide, sodium carbonate, and sodium bicarbonate and having a relatively constant and higher $H_2S$ vapor pressure than the original green liquor in said carbonation stage (B) to the countercurrent action of a gas comprising principally carbon dioxide, some nitrogen and water vapor, said gas having a flow rate sufficient to maintain a ratio of carbon dioxide to sulfide entering said stage (B) of at least 8 mols to 1, whereby to convert the sodium sulfide and sodium hydrosulfide to a non-inflammable gas product containing hydrogen sulfide up to 6% and a liquor product containing sodium bicarbonate and sodium carbonate;

dividing the gas product of said carbonation stage into two portions, one of which is recycled to the said absorption stage (A) to provide the gas reactant of that stage, and the other major portion is passed on to said conversion stage (C) where the hydrogen sulfide is mixed with air and catalytically oxidized at a temperature of from 200–400° C. to a member selected from the group consisting of elemental sulfur and sulfur dioxide;

passing any elemental sulfur produced to a sulfur conversion stage where it is oxidized to sulfur dioxide;

heating the gas entering the said conversion stage (C) with the hot gases leaving said stage (C) to maintain an even temperature during the conversion;

contacting at least a major portion of the effluent gas from the conversion stage with the liquor product of the carbonation stage (B), and the remainder of the said effluent gas, with the liquor of said sulfitation stage (E);

reacting sodium bisulfite from the said stage (E) with the liquor product of said stage (B) containing the sodium carbonate and sodium bicarbonate in said mixing stage (D) to produce a gas product containing essentially carbon dioxide and a liquor product containing essentially sodium sulfite;

returning the last-mentioned gas product to the carbonation stage (B) to provide the carbon dioxide reactant of that stage;

removing from the system a first portion of the last-mentioned liquor product containing essentially sodium sulfite, said portion being equal to the green liquor flow as produced sodium sulfite liquor, and passing a second portion of it in the said sulfitation stage (E) countercurrently to a flow of sulfur dioxide gases whereby to produce a gas product consisting essentially of nitrogen and a sodium bisulfite liquor product, returning the latter to said mixing stage (D) to provide the sodium bisulfite reactant of that stage, and relieving the said gas product from said stage (E).

2. The method of claim 1 in which about a stoichiometric proportion of air is added at said conversion stage (C) to convert the $H_2S$ principally to elemental sulfur, the gas product of said conversion stage (C) is cooled to 120–150° C., and said major portion thereof is combined with the gas product of said mixing stage (D).

3. The method of claim 1 in which sufficient excess of air is added at the conversion stage (C) to convert the $H_2S$ principally to $SO_2$, and the gas product is divided, a major portion passing to the mixing stage (D) and a smaller portion passing to the sulfitation stage (E).

4. The method of claim 1 in which the $H_2S$ concentration of the gas produced in the carbonation stage is maintained at a concentration of 1.0–6.0%.

5. The process of claim 1 in which a major portion of the hydrogen sulfide produced in the carbonation stage (B) is mixed with air and catalytically converted to sulfur, the sulfur thus produced is oxidized with make-up sulfur to sulfur dioxide, and the resulting sulfur dioxide is reacted with the sodium sulfite in the sulfitation stage (E).

6. The method of claim 2 in which the gas product from the $H_2S$ conversion stage (C) is subjected to a washing stage prior to passing on to the mixing stage (D) to remove carry-over elemental sulfur and react the residual $H_2S$ and $SO_2$ to form additional elemental sulfur in the presence of water.

7. The method of claim 6 in which the wash liquor is spent pulping liquor and, after the washing stage, is added to additional spent pulping liquor for smelting.

8. The method of claim 1 in which the flow of gas through the carbonation stage (B) is increased in response to an increase in the temperature of the gas entering the catalytic conversion stage (C); the gas flow through the absorption stage (A) is reduced in response to an increase in the concentration of $CO_2$ and $H_2S$ in the gas leaving said absorption stage (A); the flow of bisulfite liquor to the mixing stage (D) is increased in response to an increase in the pH of the liquor in said mixing stage (D).

9. The method of claim 1 in which the gas entering the conversion stage (C) is heated by recycling a controlled proportion of said gas leaving the conversion stage with the entering gas.

10. The method of claim 1 in which the gas entering the conversion stage (C) is heated by a heat exchange with the reaction gas mixture leaving the conversion stage.

11. The method of claim 1 in which the major portion of the effluent gas from the conversion stage (C) is contacted in the mixing stage with the liquor product of the carbonation stage (B) mixed with the liquor product of the sulfitation stage (E).

References Cited in the file of this patent

UNITED STATES PATENTS

| | | |
|---|---|---|
| 1,678,630 | Bahr | July 31, 1928 |
| 1,833,313 | Bradley et al. | Nov. 24, 1931 |
| 1,962,485 | Dely | June 12, 1934 |

OTHER REFERENCES

Bone et al.: "Flame and Combustion in Gases," Longmans, Green and Co., N.Y., 1927, page 488.